United States Patent
Kato et al.

(10) Patent No.: US 9,550,146 B2
(45) Date of Patent: Jan. 24, 2017

(54) NOX REDUCTION CATALYST FOR EXHAUST GAS AND METHOD FOR PRODUCING SAME

(75) Inventors: Yasuyoshi Kato, Kure (JP); Seiji Ikemoto, Kure (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 601 days.

(21) Appl. No.: 13/821,376

(22) PCT Filed: Sep. 5, 2011

(86) PCT No.: PCT/JP2011/070129
§ 371 (c)(1),
(2), (4) Date: Apr. 10, 2013

(87) PCT Pub. No.: WO2012/033039
PCT Pub. Date: Mar. 15, 2012

(65) Prior Publication Data
US 2013/0190166 A1   Jul. 25, 2013

(30) Foreign Application Priority Data

Sep. 7, 2010   (JP) ................................. 2010-199925

(51) Int. Cl.
| | | |
|---|---|---|
| *B01J 29/06* | (2006.01) | |
| *B01D 53/56* | (2006.01) | |
| *B01J 29/40* | (2006.01) | |
| *B01J 29/18* | (2006.01) | |
| *B01J 29/08* | (2006.01) | |
| *B01J 29/48* | (2006.01) | |
| *B01D 53/86* | (2006.01) | |
| *B01J 23/28* | (2006.01) | |
| *B01J 35/00* | (2006.01) | |
| *B01J 37/00* | (2006.01) | |
| *B01J 37/02* | (2006.01) | |
| *B01J 37/28* | (2006.01) | |
| *B01J 29/26* | (2006.01) | |
| *B01J 27/199* | (2006.01) | |
| *B01J 21/06* | (2006.01) | |

(52) U.S. Cl.
CPC ......... *B01D 53/565* (2013.01); *B01D 53/8628* (2013.01); *B01J 23/28* (2013.01); *B01J 27/199* (2013.01); *B01J 29/084* (2013.01); *B01J 29/088* (2013.01); *B01J 29/18* (2013.01); *B01J 29/185* (2013.01); *B01J 29/26* (2013.01); *B01J 29/40* (2013.01); *B01J 29/405* (2013.01); *B01J 29/48* (2013.01); *B01J 35/0006* (2013.01); *B01J 37/0009* (2013.01); *B01J 37/0225* (2013.01); *B01J 37/28* (2013.01); *B01D 2251/2062* (2013.01); *B01D 2255/20707* (2013.01); *B01D 2255/20723* (2013.01); *B01D 2255/20769* (2013.01); *B01D 2255/20776* (2013.01); *B01D 2255/50* (2013.01); *B01D 2255/504* (2013.01); *B01D 2255/70* (2013.01); *B01J 21/063* (2013.01); *B01J 2229/42* (2013.01)

(58) Field of Classification Search
USPC .................................. 502/60, 63, 64, 77, 78
See application file for complete search history.

(56) References Cited

U.S. PATENT DOCUMENTS

| | | | | |
|---|---|---|---|---|
| 3,279,884 | A | * 10/1966 | Nonnenmacher et al. | 423/239.1 |
| 4,466,947 | A | * 8/1984 | Imanari et al. ............ | 423/239.1 |
| 4,833,113 | A | * 5/1989 | Imanari et al. ............... | 502/309 |
| 5,024,981 | A | * 6/1991 | Speronello et al. ............ | 502/67 |
| 5,120,695 | A | * 6/1992 | Blumrich et al. .............. | 502/78 |
| 2005/0124486 | A1 | * 6/2005 | Tran ................... | B01D 53/8628 |
| | | | | 502/66 |
| 2006/0182676 | A1 | 8/2006 | Tran et al. | |
| 2008/0004462 | A1 | 1/2008 | Peters et al. | |
| 2009/0263304 | A1 | 10/2009 | Yoshida et al. | |
| 2009/0304566 | A1 | * 12/2009 | Golden et al. ............ | 423/239.2 |
| 2010/0183492 | A1 | 7/2010 | Kato et al. | |
| 2010/0322832 | A1 | 12/2010 | Prochazka, Jr. et al. | |
| 2011/0070140 | A1 | 3/2011 | Yoshida et al. | |
| 2013/0004397 | A1 | 1/2013 | Kato | |

FOREIGN PATENT DOCUMENTS

| | | |
|---|---|---|
| JP | 6-71187 | 3/1994 |
| WO | WO 2008/099814 | 8/2008 |
| WO | WO 2009/031234 | 3/2009 |
| WO | WO 2011/099492 | 8/2011 |

OTHER PUBLICATIONS

International Search Report mailed Nov. 8, 2011 for International Application No. PCT/JP2011/070129.

* cited by examiner

*Primary Examiner* — Elizabeth Wood
(74) *Attorney, Agent, or Firm* — Fay Sharpe LLP

(57) ABSTRACT

To provide a catalyst having excellent performance and durability by improving a NOx reduction ratio at 350° C. or higher without deteriorating excellent durability of a Ti—V—Mo—P catalyst in view of problems of conventional art. A NOx reduction catalyst for exhaust gas, which is composed of a catalyst composition that comprises titanium (Ti), an oxide of phosphorous, molybdenum (Mo) and/or tungsten (W), oxide of vanadium (V), and high-silica zeolite that has an $SiO_2/Al_2O_3$ ratio of not less than 20 is obtained by kneading in the presence of water, drying and calcining (1) titanium oxide, and phosphoric acid or an ammonium salt of phosphoric acid in an amount of more than 1% by weight and not more than 15% by weight relative to the titanium oxide in terms of $H_3PO_4$, (2) an oxo acid or oxo acid salt of molybdenum (Mo) and/or tungsten (W) and an oxo acid salt of vanadium (V) or vanadyl salt respectively in an amount of more than 0% by atom and not more than 8% by atom relative to the titanium oxide and (3) high-silica zeolite in an amount of more than 0% by weight and not more than 20% by weight relative to the titanium oxide.

12 Claims, No Drawings

NOX REDUCTION CATALYST FOR EXHAUST GAS AND METHOD FOR PRODUCING SAME

TECHNICAL FIELD

The present invention relates to a NOx reduction catalyst for exhaust gas and a method for producing the same, and especially to a NOx reduction catalyst for exhaust gas for catalytic reduction of nitric oxide with ammonia and a method for producing the same, wherein the deterioration by catalyst poison contained in combustion exhaust gas such as arsenic, phosphorous (P) and potassium (K) is suppressed and NOx reduction performance at temperatures of 350° C. or higher is significantly improved.

BACKGROUND ART

Catalyst for catalytic reduction of nitric oxide with ammonia having titanium oxide as the main component exhibits superior activity and durability, and as such, has been widely used for treatment of boiler exhaust gas, and has become mainstream of the catalyst for NOx reduction (see Patent Document 1 and the like).

With the recent increase in demand for energy, a variety of fuels have been increasingly in use such as coal with high sulfur content (high S coal), PRB coal, biomass and the like, and with this trend, the mode of deterioration of NOx reduction catalyst for exhaust gas is also becoming diverse. Some of the well known examples include the deterioration by arsenic (As) compounds as often seen with the use of high S coal, the deterioration by P compounds as often seen with the use of PRB coal, and the deterioration by potassium (K) compounds as often seen with the use of biomass fuel. All of these are known to be caused by the accumulation of catalyst poison that quickly accumulates in the catalyst, inducing a significant decrease in the NOx reducing ability in a short amount of time.

In regard to the above, the inventors of the present application have already invented a Ti—V—Mo—P based catalyst that prevents accumulation of the aforementioned poisons in titanium oxide and have filed an application for a patent (see non-prior art: Patent Document 2).

CITATION LIST

Patent Documents

Patent Document 1: JP S50-128681 A
Patent Document 2: JP 2011-161364 A

SUMMARY OF THE INVENTION

Problems to be Resolved by the Invention

The catalyst according to the earlier application has many advantages, not only in exhibiting extremely high resistance to As, P, K compounds but also in having a low ratio of $SO_2$ oxidation, and high activity in Hg oxidation. However, one area that needs an improvement is the poor increase in the NOx reduction performance when a reaction temperature is raised from 350° C. to 400° C., which is much smaller compared to conventional catalyst. NOx reduction of exhaust gas in boilers using high S coal often occurs around the temperature of 400° C., and if the performance of NOx reduction at around 400° C. can be improved, the catalyst would become even more desirable.

The problem to be solved by the present invention is to provide a catalyst having excellent performance and durability by improving a NOx reduction ratio at 350° C. or higher without deteriorating excellent durability of a Ti—V—Mo—P based catalyst.

Means for Solving the Problems

The non-published catalyst according to the earlier application above was invented from an idea attempting to prevent deterioration of catalyst by blocking the adsorption of catalyst poison derived from the exhaust gas through saturating the adsorption sites for catalyst poison wherein the sites exist on titanium oxide with phosphoric acid which is one of catalyst poisons. The adsorption sites for phosphoric acid also bind the active ingredient V and the catalyst aiding agents, namely, oxides of Mo and W. As the result, the adsorption sites on the surface of the catalyst (that is titanium oxide) is completely covered with these ingredients. This in turn causes significant reduction of the adsorption of catalyst poisons from the exhaust gas, however, it also brings about a side effect of reducing the available adsorption sites for $NH_3$ and decreasing the adsorptivity for $NH_3$. As the result, a phenomenon is observed where the amount of adsorbed $NH_3$ is decreased at a high temperature while the NOx reduction performance hardly increases and rather reaches a ceiling, even if the temperature is raised to 350° C. or higher. The present inventors, in an attempt to improve on this point, thought of adding and complementing an ingredient that strongly adsorbs $NH_3$ but does not adsorb catalytic poisons such as As and P, and investigated using a variety of chemical substances. They found that all of the candidates tested lose the ability to adsorb $NH_3$ after adsorbing the P compounds and As compounds in the exhaust gas and therefore are unusable, with one exception of high-silica zeolite that exhibited a significant improvement effect, and were able to complete the present invention.

In order to solve the above-mentioned problems, the invention that is claimed in the present application provides the following.

(1) A NOx reduction catalyst for exhaust gas, which is composed of a catalyst composition that comprises titanium (Ti), an oxide of phosphorous (P), molybdenum (Mo) and/or tungsten (W), oxide of vanadium (V), and high-silica zeolite that has an $SiO_2/Al_2O_3$ ratio of not less than 20, is obtained by kneading in the presence of water, drying and then calcining [1] titanium oxide, phosphoric acid or an ammonium salt of phosphoric acid in an amount of more than 1% by weight and not more than 15% by weight relative to the titanium oxide in terms of $H_3PO_4$, [2] an oxo acid or oxo acid salt of molybdenum (Mo) and/or tungsten (W) and an oxo acid salt of vanadium (V) or vanadyl salt, respectively, in an amount of more than 0% by atom and not more than 8% by atom relative to the titanium oxide, and [3] high-silica zeolite in an amount of more than 0% by weight and not more than 20% by weight relative to the titanium oxide.

(2) The NOx reduction catalyst of (1) wherein the high-silica zeolite is mordenite.

(3) A method for producing a NOx reduction catalyst for exhaust gas comprising the steps of
bringing titanium oxide into contact with phosphoric acid or ammonium salt of phosphoric acid in the presence of water to adsorb phosphoric acid ion on the surface of the titanium oxide, adding an oxo acid or an oxo acid salt of molybdenum (Mo) and/or tungsten (W), an oxo acid salt of vanadium (V) or vanadyl salt, and high-silica zeolite thereto to obtain a mixture, kneading the mixture in the presence of water, drying the kneaded mixture, and calcining the dried mixture.

Advantageous Effects of the Invention

According to the present invention, a NOx reduction catalyst having high performance and high durability is realized by improving the NOx reduction performance of highly durable catalyst component at temperature of 350° C. or higher. As the result, it becomes possible to reduce the amount of catalyst used in the NOx reduction apparatus for exhaust gas emitted from a boiler using high S coal, which is often operated in US at the temperature of around 400° C., and also make the apparatus more compact.

Zeolite has a numerous pores of not more than 10 Å that have excellent adsorption sites inside capable of adsorbing $NH_3$ tightly. If these adsorption sites are invaded by catalyst ingredients or catalyst poisons in the exhaust gas, the effect of additives can no longer be exerted. However, in the process of preparing the catalyst, Mo, V, W, and P components are added as their oxo acids, meaning that the sizes of these ions are bigger than 10 Å. Therefore they cannot interfere with the $NH_3$ adsorption sites on the zeolite during the preparation of the catalyst. In addition, the compounds of As and P in the exhaust gas comes flying as the vapor of respective oxides, whose sizes are also bigger than 10 Å, therefore, they will also not be able to enter the pores, thus preserving the $NH_3$ adsorption sites even during the use.

As seen above, the $NH_3$ adsorption sites inside the pores of zeolite are preserved during the preparation as well as the use of the catalyst, and compensate for the reduction of adsorbed amount of $NH_3$ on Ti—Mo—V—P ingredient seen when the catalyst is used at temperatures exceeding 350° C., thereby maintaining the NOx reduction performance.

The present invention is a ground breaking catalyst that only became possible by combining the zeolite whose $NH_3$ adsorption sites are protected from P and oxo acid salts of active ingredients throughout the preparation as well as the use of catalyst as seen above, and the highly durable catalyst ingredients.

EMBODIMENTS FOR CARRYING OUT THE INVENTION

The catalyst of the present invention thus is only achieved by the synergistic action of two components, namely, $TiO_2$ adsorbed with phosphoric acid ion preventing catalyst poisons from entering the catalyst, and zeolite component maintaining the adsorption sites of $NH_3$, and as such, following points should be considered.

The amount of $PO_4$ ion that can be adsorbed on the titanium oxide is about 0.05% by weight per surface area of $TiO_2$. In $TiO_2$ raw material of 100 to 300 $m^2/g$ that is normally used, the maximum amount that can be adsorbed is 5 to 15% by weight. When it is more than that amount, the OH group that can adsorb $NH_3$ will be lost, causing a significant reduction in the activity. Therefore, even though it depends on the types of the $TiO_2$ raw material, the additive amount of $H_3PO_4$ is not more than 15% by weight, and more preferably not more than 10% by weight with respect to $TiO_2$, in terms of achieving good performance in both durability and NOx reduction ability and obtaining good result. There are no restrictions with regard to the lower limit of the additive amount, however, in order to give significant poison resistance, the amount should be not less than 1% by weight with respect to $TiO_2$.

In regard to the active ingredient to be combined with the $TiO_2$ adsorbed with phosphoric acid ions, an oxo acid or an oxo acid salt of molybdenum (Mo) and/or tungsten (W) and an oxo acid salt of vanadium (V) or vanadyl salt may be used. There are no restrictions in terms of the additive amount, however, each of them are to be used at an amount of more than 0% by atom and not more than 8% by atom. It is beneficial selecting a larger additive amount when the specific surface area of $TiO_2$ is large and selecting a smaller additive amount when the area of $TiO_2$ is small, because it would facilitate higher NOx reduction performance, while keeping the oxidative ability of $SO_2$ low. Any methods may be used to add these active ingredients, however, methods utilizing kneading in the presence of water or kneading while heating in the presence of water is economical and superior.

As to the zeolite component that is to be combined with the above described catalyst component, mordenite or pentasil type zeolites having a $SiO_2/Al_2O_3$ ratio of not less than 20 are preferred, and the good result tends to be achieved when the $SiO_2/Al_2O_3$ ratio is not less than 20 and not more than 30. When the ratio is too low, the S components in the exhaust gas or catalyst ingredients can damage the structure, whereas when the ratio is too high, the active spots for $NH_3$ decreases, making it difficult to attain high activity improvement.

The catalyst component after the active ingredients are supported thereon, can be used by forming a honeycomb shape by any of the well known methods, or as a part of the structure processed through the steps including, coating the catalyst component onto a metal substrate processed into a lath or onto a ceramic fiber formed into a net-like shape, so that their openings are filled, followed by molding them into plates and introducing wavy patterns that functions as spacers, and finally layering them. The latter especially, tends to give good result since the ash containing potassium compounds usually do not accumulate between the catalysts.

In addition, additives that are not directly relevant for the present invention, for example, binders such as silica sol used for molding, or inorganic fibers for reinforcement purpose, may also be added. The resulting catalysts are also considered to be within the scope of the present invention.

EXAMPLES

The present invention is described below in detail by way of examples.

Example 1

900 g of titanium oxide (Ishihara Sangyo Kaisha, Ltd., specific surface area of 290 $m^2/g$), 84.5 g of 85% phosphoric acid, 219 g of silica sol (product name: OS sol, from Nissan Chemical Industries, Ltd.), and 5568 g of water were placed in a kneader and kneaded for 45 minutes to let the phosphoric acid adsorb on the surface of $TiO_2$. To this, 113 g of ammonium molybdate, 105 g of ammonium metavanadate, and 90 g of H type mordenite (TSZ-650 from Tosoh Corporation, $SiO_2/Al_2O_3$ ratio=23) were added and the mixture was further kneaded for 1 hour, so that Mo and V compounds were supported on the surface of $TiO_2$ adsorbed with phosphoric acid. Subsequently, 151 g of silica alumina based ceramic fiber (Toshiba Fine Flex K.K.) was slowly added while kneading for 30 minutes to obtain a uniform paste. The paste thus obtained was then placed on a metal lath substrate having a thickness of 0.7 mm made from SUS430 steel plate having a thickness of 0.2 mm. After sandwiching between two polyethylene sheets, the substrate was passed through a pair of pressuring rollers, coating and filling the openings of the metal lath substrate with the paste. After air drying, it was calcined at 500° C. for 2 hours to obtain the catalyst. The catalyst had the compositional atomic ratio of Ti/MoN=88/5/7, and the additive amounts of $H_3PO_4$ and zeolite were 8% by weight and 10% by weight, respectively, relative to $TiO_2$.

Examples 2 and 3

The catalysts were prepared in the same way as in Example 1 except that the additive amount of phosphoric acid was changed to 10.6 g and 42.4 g, respectively.

Example 4

The catalyst was prepared in the same way as in Example 1 except that the additive amount of phosphoric acid was changed to 159 g, the additive amount of ammonium metavanadate was changed to 121 g, and 180 g of H type mordenite, TSZ-640 (product name) from Tosoh Chemicals ($SiO_2/Al_2O_3$=22) was used. The catalyst had the compositional atomic ratio of Ti/Mo/V=88/5/8, and the additive amounts of $H_3PO_4$ and zeolite were 15% by weight and 20% by weight, respectively, relative to $TiO_2$.

Examples 5 and 6

The catalysts were prepared in the same way as in Example 1 except that the titanium oxide used in Example 1 was changed to a titanium oxide having a specific surface area of 90 $m^2/g$, the additive amount of phosphoric acid to the catalyst was changed to 4% by weight relative to $TiO_2$, and the amounts of ammonium metavanadate and ammonium molybdate were each changed to 6.8 g and 61.8 g, and 27.7 g and 62.7 g, respectively, and 27 g of H type mordenite, TSZ-660 (product name) from Tosoh Chemicals ($SiO_2/Al_2O_3$=31) was used. The catalysts had the compositional atomic ratio of Ti/Mo/V=96.5/3/0.5, and 95/3/2, and the additive amounts of $H_3PO_4$ and zeolite were 4% by weight and 3% by weight, respectively, relative to $TiO_2$.

Example 7

The catalyst was prepared in the same way as in Example 1 except that 113 g of ammonium molybdate used in Example 1 was changed to 162 g of ammonium metatungstate, and the additive amount of H type mordenite was changed to 9 g. The catalyst had compositional atomic ratio of Ti/W/V=88/5/7, and the additive amounts of $H_3PO_4$ and zeolite were 8% by weight and 1% by weight, respectively, relative to $TiO_2$.

Comparative Examples 1 to 7

The catalysts were prepared in the same way as in Examples 1 to 7 except that zeolite addition was not performed.

Comparative Examples 8 to 11

The catalysts were prepared in the same way as in Example 1, and 5 to 7 except that phosphoric acid addition and adsorption steps were not carried out.

Test Example 1

The catalysts of Examples 1 to 7 and Comparative Examples 1 to 7 were cut out into pieces of 20 mm wide×100 mm long, and the NOx reduction performance of respective catalysts were measured under the condition listed in Table 1. The results are shown in Table 2.

As can be seen in Table 2, when the performance of catalysts of Examples and Comparative Examples of the present invention are compared, the difference among them are small at 350° C., however, at 400° C. the performance of the Examples are significantly higher, suggesting that they are superior catalysts with improved NOx reduction ability at temperatures of 350° C. or higher.

Test Examples 2 and 3

In order to clarify the advantage of the catalysts of the present invention, the catalysts of Examples 1 and 5 to 7, and Comparative Examples 8 to 17 were cut out into pieces of 20 mm wide×100 mm long, and impregnated with aqueous solution of potassium carbonate so that its additive amount would be 0.5% by weight relative to the catalyst component in terms of $K_2O$, Subsequently, they were dried at 150° C., and subjected to a test simulating the deterioration by the potassium compounds contained in the biomass combustion ash.

Independently of this, the catalysts of Examples 1 and 5 to 7 and Comparative Examples 8 to 17, were impregnated with aqueous solution of arsenious acid so that the amount of $As_2O_3$ would be 2% by weight relative to the catalyst component. Subsequently, they were calcined at 350° C. for 1 hour and a test simulating the deterioration by high S coal exhaust gas was performed.

In regard to the catalysts subjected to the two tests described above and the catalysts not subjected to the tests, the NOx reduction performance were measured using the conditions shown in Table 3, and the resistance to catalyst poisoning was evaluated for each of the catalysts. The results are summarized in Table 4.

As can be seen in Table 4, when the performance of each of the catalysts are compared, the catalysts according to the Examples of the present invention exhibit significantly less deterioration by the potassium and arsenic compounds, and are superior in durability.

From this result and results of test examples, it is clear that the catalyst of the present invention is superior in terms of its characteristics at a high temperature 350° C. or higher, as well as its resistance against deterioration by the catalyst poisons such as K and As.

TABLE 1

| Category | Value |
|---|---|
| 1. gas compositional ratio | |
| $NO_x$ | 200 ppm |
| $NH_3$ | 240 ppm |
| $SO_2$ | 500 ppm |
| $O_2$ | 3% |
| $CO_2$ | 12% |
| $H_2O$ | 12% |
| 2. gas flow rate | 3.7 liter/min |
| 3. temperature | 350 deg C./ 400 deg C. |
| 4. catalyst load amount | 20 mm width × 100 mm (length) 1 piece |

TABLE 2

| catalyst | 350 deg C. NO$_x$ reduction ratio [%] | 400 deg C. NO$_x$ reduction ratio [%] |
|---|---|---|
| Ex. 1 | 75.5 | 76.4 |
| Ex. 2 | 81.7 | 85.3 |
| Ex. 3 | 79.5 | 82.1 |
| Ex. 4 | 74.2 | 75.3 |
| Ex. 5 | 64.9 | 69.2 |
| Ex. 6 | 70.9 | 72.2 |
| Ex. 7 | 76.1 | 78.1 |
| Comp. Ex. 1 | 74.8 | 73.0 |
| Comp. Ex. 2 | 81.5 | 81.5 |
| Comp. Ex. 3 | 78.9 | 79.0 |
| Comp. Ex. 4 | 72.0 | 71.7 |
| Comp. Ex. 5 | 62.2 | 64.0 |
| Comp. Ex. 6 | 70.6 | 71.3 |
| Comp. Ex. 7 | 76.9 | 74.5 |

TABLE 3

| Category | Value |
|---|---|
| 1. gas compositional ratio | |
| NO$_x$ | 200 ppm |
| NH$_3$ | 240 ppm |
| SO$_2$ | 500 ppm |
| O$_2$ | 3% |
| CO$_2$ | 12% |
| H$_2$O | 12% |
| 2. gas flow rate | 3.7 liter/min |
| 3. temperature | 350 deg C. |
| 4. catalyst load amount | 20 mm width × 100 mm (length) 3 pieces |

TABLE 4

| catalyst | Initial NO$_x$ reduction ratio [%] | NO$_x$ reduction ratio [%] after K deterioration test | NO$_x$ reduction ratio [%] after As deterioration test |
|---|---|---|---|
| Ex. 1 | 99.1 | 98.1 | 94.8 |
| Ex. 5 | 95.3 | 83.9 | 89.8 |
| Ex. 6 | 97.4 | 87.7 | 93.0 |
| Ex. 7 | 99.1 | 98.1 | 96.1 |
| Comp. Ex. 8 | 99.2 | 78.4 | 85.8 |
| Comp. Ex. 9 | 96.4 | 62.7 | 72.1 |
| Comp. Ex. 10 | 98.2 | 69.9 | 77.5 |
| Comp. Ex. 11 | 99.5 | 72.5 | 80.9 |

The invention claimed is:

1. A NOx reduction catalyst for exhaust gas, in which the catalyst has adsorption sites for NH$_3$ and the catalyst comprises
a calcination product comprising titanium (Ti), an oxide of phosphorous (P), molybdenum (Mo) and/or tungsten (W), an oxide of vanadium (V), and a high-silica zeolite having a SiO$_2$/Al$_2$O$_3$ ratio of not less than 20 and not more than 31, in which the high-silica zeolite is mordenite or pentasil type zeolite.

2. The NOx reduction catalyst according to claim 1, in which
the titanium is derived from titanium oxide,
the oxide of phosphorous is derived from phosphoric acid or an ammonium salt of phosphoric acid in the amount of more than 1% by weight and not more than 15% by weight relative to the titanium oxide in terms of H3PO4,
the molybdenum (Mo) and/or tungsten (W) are/is derived from an oxo acid or oxo acid salt of molybdenum (Mo) and/or tungsten (W) in the amount of more than 0% by atom and not more than 8% by atom relative to the titanium oxide,
the oxide of vanadium (V) is derived form an oxo acid salt of vanadium (V) or vanadyl salt in the amount of more than 0% by atom and not more than 8% by atom relative to the titanium oxide, and
the amount of the high-silica zeolite is more than 0% by weight and not more than 20% by weight relative to the titanium oxide.

3. The NOx reduction catalyst according to claim 1, in which the calcination product consists of titanium (Ti), the oxide of phosphorous (P), molybdenum (Mo) and/or tungsten (W), the oxide of vanadium (V), and the high-silica zeolite.

4. The NOx reduction catalyst according to claim 1, in which the high-silica zeolite has an SiO$_2$/Al$_2$O$_3$ ratio of not less than 20 and not more than 30.

5. A method for producing a NOx reduction catalyst for exhaust gas according to claim 1, the method comprising the steps of
bringing titanium oxide into contact with phosphoric acid or ammonium salt of phosphoric acid in the presence of water to adsorb phosphoric acid ion on the surface of the titanium oxide,
adding an oxo acid or an oxo acid salt of molybdenum (Mo) and/or tungsten (W), an oxo acid salt of vanadium (V) or vanadyl salt, and high-silica zeolite to the titanium oxide adsorbed with phosphoric acid ion to obtain a mixture, wherein the high-silica zeolite has a SiO$_2$/Al$_2$O$_3$ ratio of not less than 20 and not more than 31, in which the high-silica zeolite is mordenite or pentasil type zeolite,
kneading the mixture in the presence of water,
drying the kneaded mixture, and
calcining the dried mixture.

6. The method according to claim 5, in which
the amount of the phosphoric acid or the ammonium salt of phosphoric acid is more than 1% by weight and not more than 15% by weight relative to the titanium oxide in terms of H3PO4,
the amount of the oxo acid or the oxo acid salt of molybdenum (Mo) and/or tungsten (W) is more than 0% by atom and not more than 8% by atom relative to the titanium oxide,
the amount of the oxo acid salt of vanadium (V) or the vanadyl salt is more than 0% by atom and not more than 8% by atom relative to the titanium oxide, and
the amount of the high-silica zeolite is more than 0% by weight and not more than 20% by weight relative to the titanium oxide.

7. The method according to claim 5, in which the high-silica zeolite has an SiO$_2$/Al$_2$O$_3$ ratio of not less than 20 and not more than 30.

8. A method for producing a NOx reduction catalyst for exhaust gas according to claim 1, the method comprising the steps of
kneading titanium oxide, phosphoric acid or an ammonium salt of phosphoric acid, an oxo acid or oxo acid salt of molybdenum (Mo) and/or tungsten (W), an oxo acid salt of vanadium (V) or vanadyl salt, and high-silica zeolite in the presence of water to obtain a kneaded mixture, wherein the high-silica zeolite has a SiO$_2$/Al$_2$O$_3$ ratio of not less than 20 and not more than 31, in which the high-silica zeolite is mordenite or pentasil type zeolite,
drying the kneaded mixture, and
calcining the dried mixture.

9. The method according to claim 8, in which
the amount of the phosphoric acid or the ammonium salt of phosphoric acid is more than 1% by weight and not more than 15% by weight relative to the titanium oxide in terms of $H_3PO_4$,
the amount of the oxo acid or the oxo acid salt of molybdenum (Mo) and/or tungsten (W) is more than 0% by atom and not more than 8% by atom relative to the titanium oxide,
the amount of the oxo acid salt of vanadium (V) or the vanadyl salt is more than 0% by atom and not more than 8% by atom relative to the titanium oxide, and
the amount of the high-silica zeolite is more than 0% by weight and not more than 20% by weight relative to the titanium oxide.

10. The method according to claim 8, in which the high-silica zeolite has an $SiO_2/Al_2O_3$ ratio of not less than 20 and not more than 30.

11. The NOx reduction catalyst for exhaust gas according to claim 1, wherein the catalyst further comprises a metal substrate processed into a lath or a ceramic fiber formed into a net-like shape.

12. The NOx reduction catalyst for exhaust gas according to claim 1, wherein the catalyst further comprises binders, a silica sol, or inorganic fibers.

* * * * *